LIGHT RESPONSIVE DEVICE FOR AUTOMATICALLY CONTROLLING A LOAD

Filed Aug. 1, 1966 Sheet 1 of 2

INVENTOR
Richard D. Angelari
BY Polachek & Saulsbury
ATTORNEYS

LIGHT RESPONSIVE DEVICE FOR AUTOMATICALLY CONTROLLING A LOAD

Filed Aug. 1, 1966

INVENTOR
Richard D. Angelari
BY Polachek & Saulsbury
ATTORNEYS

United States Patent Office 3,421,013
Patented Jan. 7, 1969

3,421,013

LIGHT RESPONSIVE DEVICE FOR AUTOMATICALLY CONTROLLING A LOAD

Richard D. Angelari, 334 W. 71st St., New York, N.Y. 10023

Filed Aug. 1, 1966, Ser. No. 569,392
U.S. Cl. 250—239 1 Claim
Int. Cl. H01j 39/12

ABSTRACT OF THE DISCLOSURE

A light responsive device for automatically turning a load on and off is disclosed. The device has a tapered housing disengageably mounted on a base plate and held by a flexible grooved ring. A photoelectric cell is mounted at the narrow top of the housing. Electrical control circuitry is mounted inside the housing on the base plate and is connected in circuit with the photoelectric cell. The circuitry is accessible for servicing by removing the ring and separating the housing and base plate.

This invention concerns a light responsive power switching device.

Heretofore, light responsive power switches have conventionally employed electromagnetic relays of various types. The present invention has as a principal object provision of a light responsive power switch assembly which employs a silicon controlled relay and avoids use of electromagnetic relays.

A further object is to provide a novel construction for a light responsive power switch device which can be used to turn on lamps, resistive loads, or direct current loads of various types whenever ambient light conditions fall below a predetermined level.

Another object is to provide a device of the character described which consumes a negligibly small amount of power, which is automatic in operation, which can be used with many small appliances, which is all electronic in operation, which requires no settings or adjustment, and which adapts itself to changing seasonal conditions.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figures 1, 2, 3, 4:
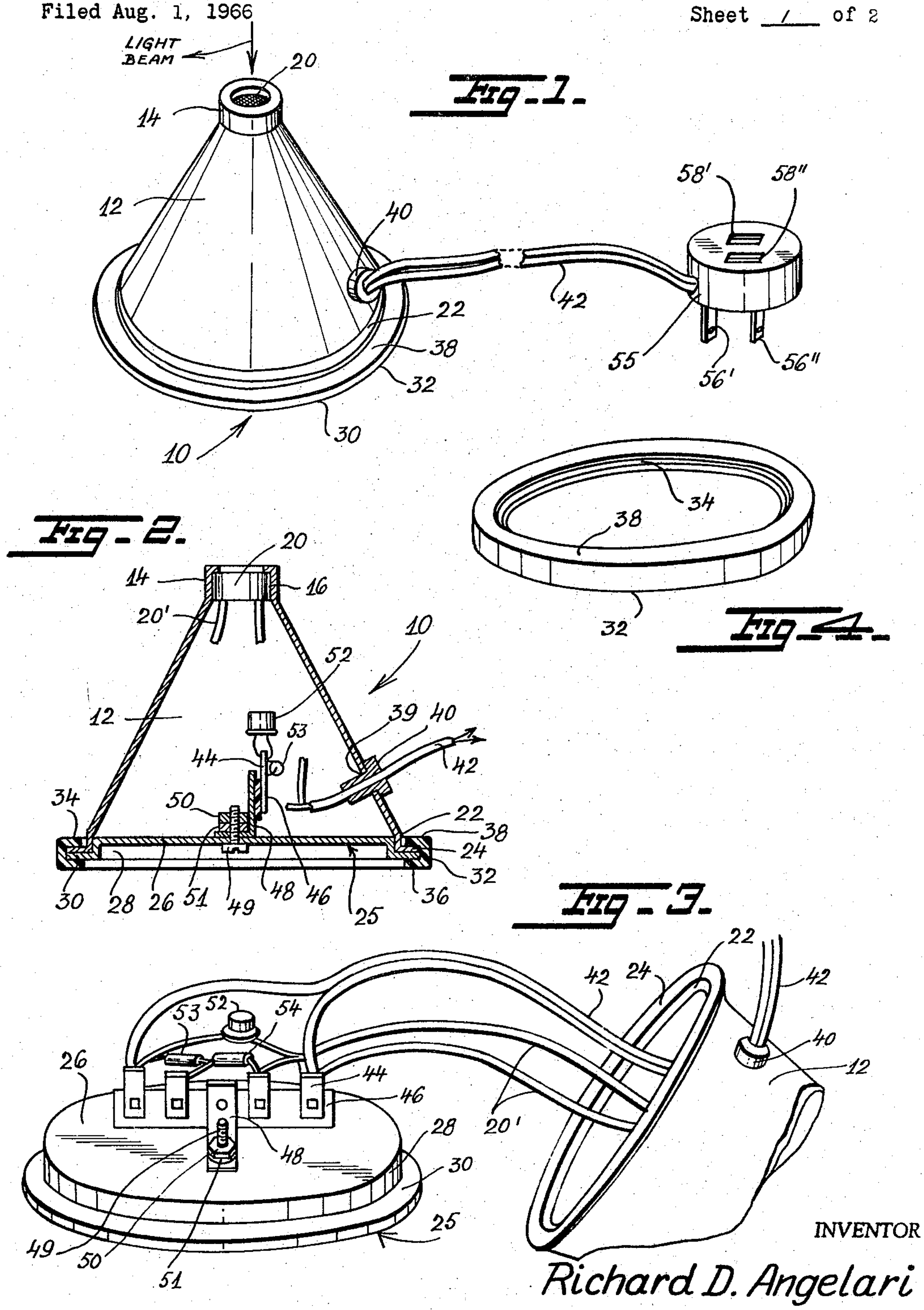
FIGURE 1 is a perspective view of a device embodying the invention.
FIG. 2 is a vertical sectional view through a part of the device.
FIG. 3 is a perspective view of parts of the device in open condition.
FIG. 4 is a perspective view of a mounting and closure ring of the device.

Referring first to FIGS. 1–3, there is shown the device 10 comprising a conical housing 12 preferably made of metal. At its apical end, the housing has a cylindrical extension 14 open at the top. In the cylindrical extension 14 is secured by adhesive 16 or other suitable means is a cylindrical photoresistive or photoconductive type of photoelectric cell 20. Such a cell responds to changing impinging light levels by changing its internal ohmic resistance. Thus, any electric current which may be passed through the cell is varied in magnitude depending on the changes in electrical resistance of the cell.

The housing has an open bottom and is formed with a lower cylindrical section 22 terminating in an annular, radial flange 24. The housing is closed by a base plate 25. This plate is dished in form with a central circular section 26, a cylindrical skirt 28 and peripheral annular radial flange 30. The base plate fits snugly and telescopically into the bottom of the housing with skirt 28 concentric with cylindrical section 22 and with flanges 24 and 30 abutting each other.

A channeled endless ring 32 made of elastic material such as artificial rubber is used to secure the housing and base plate together. The ring has an internal groove 34 best shown in FIGS. 2 and 4, in which engages the abutted flanges 24 and 30. The ring has one side wall 36 supporting the entire assembly in a non-slip, insulating arrangement. The other side wall 38 overlays the upper flange 24.

In the side of housing 12 is an opening 39 in which is fitted a grommet 40. An electric cord 42 passes through the grommet and terminates at lugs 44 on a terminal board or plate 46. The plate 46 is supported by an L-shaped lug 48 above the circular section 25 of plate 25. A bolt 49, nut 50 and washer 51 securely engage lug 48 to hold plate 46 upright. Lead wires 20' extending downward from cell 20 terminate at lugs on the terminal plate 46. A silicon controlled rectifier 52 is also attached to lugs of the terminal plate along with other electrical components 53, 54 of circuit C1 shown in FIG. 5. The cord 42 terminates at a male-female connector 55 having prongs 56', 56'' for connection to a suitable A.C. power supply, and having socket terminals 58', 58'' into which can be plugged a lamp or other load to be controlled by the device.

Figure 5:
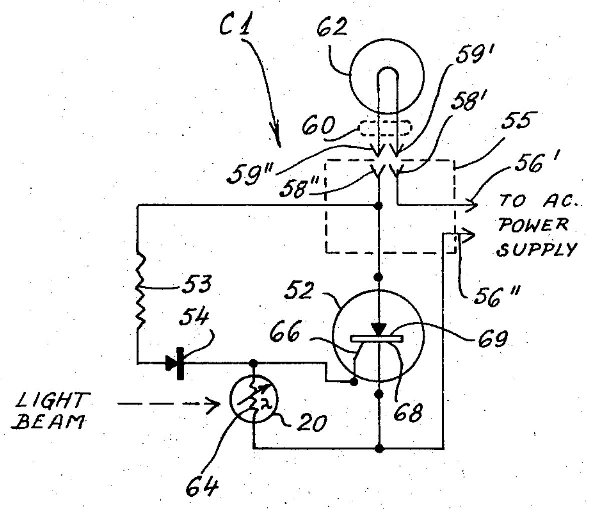
FIGS. 5 and 6 are diagrams of electronic circuitry which may be employed in the device.

Referring now to FIG. 5, it will be noted that prong 56' is connected to socket terminal 58', for receiving one prong 59' of plug 60 to which lamp 62 is connected. The other prong 59'' of plug 60 can be inserted into the other socket terminal 58''. Terminal 58'' is connected to resistor 53 which is connected in series with rectifier 54. Rectifier 54 is connected to photosensitive element 64 of cell 20 and to control gate 66 of the silicon controlled rectifier 52. The base 68 of the rectifier is connected along with the element 64 to the other prong 56''. Prongs 56' and 56'' forming part of connector 56 can be connected to a suitable A.C. power supply. Anode 69 is connected to socket terminal 58''. Lamp 62 is in series with cell 20.

In operation of the device 10 including circuit C1, housing 12 can be placed on any surface where cell 20 will be exposed to ambient light. Light rays impinging on the photosensitive element 64 cause this element to increase in conductivity or to lower in electrical resistance. The prongs 56', 56'' of the connector 55 are inserted into a suitable A.C. power supply. A current limited by resistor 53 and lamp 62 passes through the cell 20 which now has a low impedance so that a very low voltage is applied to gate 66. Thus, the rectifier 52 is gated off. Lamp 62 does not light because the rectifier interposes a high impedance in its power supply circuit. At dusk or whenever the ambient light impinging on the cell 20 falls to a predetermined level, the ohmic resistance and impedance of cell 20 increases to a high value. This results in application of a sufficiently high voltage to the control gate 66 so that the "breakover" voltage of the rectifier is exceeded. This triggers the rectifier to conduct. Its impedance falls to a low value and the lamp 62 lights. The lamp lights fully for only one half of each A.C. cycle and then dims or extinguishes for each alternate half cycle. The cyclical turning on and off of the lamp occurring sixty times per second is not noticed by human eyes, but it has the desirable result that the lamp consumes only about one half normal rated power. When the light level again rises to predetermined level, the resistance of cell 20 falls, rectifier 52 is triggered off and the lamp remains extinguished until the ambient light level again falls to predetermined level.

Figure 6:
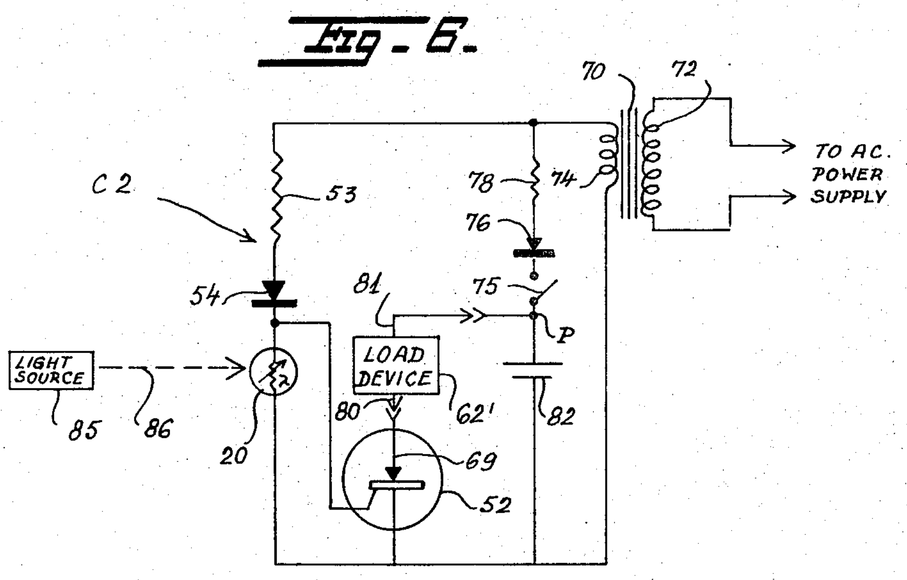

The circuit C2 shown in FIG. 6 is similar to circuit C1 and corresponding parts are identically numbered. The circuit C2 is adapted to controlling the switching of power on and off automatically for any load such as alarm, electrical appliance or the like. The device employing circuit C2 can be used as a counting device, burglar alarm of the like.

In circuit C2 a stepdown transformer 70 having primary winding 72 and secondary winding 74 are provided. A manually operable switch 75 is connected in series with rectifier 76 and resistor 78. The secondary winding 74 is connected to resistor 78 and to resistor 53 in series with rectifier 54. The load device 62' which can be any alarm or other suitable power consuming device has one terminal 80 connected to anode 69 of rectifier 52. The other terminal 81 of the load device is connected to point P between switch 75 and capacitor 82. Capacitor 82 minimizes current fluctuations in the load device. The primary winding 72 is connected to a suitable A.C. power supply. An appropriate light source 85 is disposed for illuminating cell 20, but this light beam 86 is subject to interruption.

In circuit C2 when cell 20 is illuminated then the rectifier 52 is triggered off as explained above. When the light beam 86 is interrupted, the impedance of cell 20 rises, rectifier 52 is triggered on and the load device 62' is energized. When cell 20 is again illuminated, the rectifier 52 is triggered off and the load device 62' is deenergized again.

It will be noted that operation of the power switching device employing circuit C1 or C2 is entirely automatic. It is wholly electronic and employs no relays having moving parts. The metal structure of housing 12 serves as a heat sink to conduct heat away from the cell 20 so that its sensitivity is not adversely affected by heat generated in the electronic circuitry or by ambient heat.

The device 10 is light in weight. It can be manufactured relatively inexpensively. It is safe to use, reliable in operation, and will provide long useful service.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An assembly for automatically turning a load device on and off in response to predetermined light levels, comprising a conical housing having a narrow open apical end, and an open, wide bottom end having an annular flange, a base plate detachably engaged in the wide bottom end of the conical housing, said plate having another annular flange, a grooved elastic ring detachable securing the closure plate and housing together with the flanges abutted and held by the ring; a photoresistive cell mounted in the apical end of the housing for exposure to ambient light; electronic control circuitry mounted on said base plate entirely inside the housing, said circuitry being connected in circuit with said cell and being readily accessible for servicing by removal of the grooved elastic ring to release the housing from the base plates, said ring having an annular wall portion located below the housing and plate to serve as a non-slipping insulative shock absorbing support; and electric supply cord extending through a side of said housing and connected to said circuitry for supplying electric current thereto, said housing being made of metal to conduct and radiate heat away from said cell.

References Cited

UNITED STATES PATENTS

| | | | |
|---|---|---|---|
| 2,831,981 | 4/1958 | Watts | 250—239 |
| 3,052,816 | 9/1962 | Bernheim | 315—159 |
| 3,176,189 | 3/1965 | Tabet | 315—158 |
| 3,209,154 | 9/1965 | Maring | 250—206 X |
| 3,213,286 | 10/1965 | Ehret et al. | 250—239 |
| 3,361,931 | 1/1968 | Vollrath | 250—206 X |

JOHN W. HUCKERT, *Primary Examiner.*

R. F. POLISSACK, *Assistant Examiner.*

U.S. Cl. X.R.

250—206; 315—149, 156, 157, 158, 159; 307—308, 311